United States Patent
Neu

[19]

[11] Patent Number: 6,044,860
[45] Date of Patent: Apr. 4, 2000

[54] ADJUSTABLE LOCKOUT DEVICE FOR KNIFE GATE VALVES

[75] Inventor: Steven K. Neu, Paynesville, Minn.

[73] Assignee: SPX Corporation, Muskegon, Mich.

[21] Appl. No.: 09/241,247

[22] Filed: Feb. 1, 1999

[51] Int. Cl.[7] .................................................. F16K 35/00
[52] U.S. Cl. .............................. 137/385; 251/90; 70/177
[58] Field of Search .................................. 251/89, 90, 91, 251/326; 70/177; 137/385

[56] References Cited

U.S. PATENT DOCUMENTS

| 1,689,236 | 10/1928 | Fraser, Jr. .............................. | 251/90 X |
| 4,231,389 | 11/1980 | Still et al. ............................. | 251/89 X |
| 4,962,785 | 10/1990 | Clifford . | |
| 5,353,833 | 10/1994 | Martinez .............................. | 70/177 X |
| 5,394,715 | 3/1995 | Guérette ................................ | 251/90 X |

OTHER PUBLICATIONS

Technaflow, Inc. Brochure; TF 1000 High Performance Knife Gate (publication date unknown).

DeZurik Bulletin No. 33.00–1, entitled "DeZurik Cast Stainless Steel Knife Gate Valves", front and back covers sheets, pp. 2–9; (Jul., 1988).

DeZurik Drawing No. J–74837 of prior art lockout device.

*Primary Examiner*—Kevin Lee
*Attorney, Agent, or Firm*—Hovey, Williams, Timmons & Collins

[57] ABSTRACT

A lockout device is designed for use with a valve having a pair of spaced apart, generally opposed abutment surfaces, with at least one of the abutment surfaces being shiftable relative to the other in such manner that the spacing between the surfaces decreases when the valve is actuated from a select condition. The lockout device includes a pair of generally oppositely facing engagement faces positionable between the abutment surfaces, and the device is adjustable so that the user may vary the distance between the engagement faces. In this respect, the lockout device may be disposed between the abutment surfaces and the engagement faces may be brought into secure, positive engagement with the abutment surfaces when the valve is in the select condition. This will prevent movement of the at least one abutment surface toward the other, and thereby prevent actuation of the valve.

30 Claims, 3 Drawing Sheets

ADJUSTABLE LOCKOUT DEVICE FOR KNIFE GATE VALVES

RELATED APPLICATIONS

Not Applicable

FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention relates generally to knife gate valves for controlling material flow along a path. More particularly, the present invention concerns an adjustable lockout device configured to securely lock the valve in a desired condition, and an improved valve design for use with the adjustable lockout device.

2. Discussion of Prior Art

Those ordinarily skilled in the art will appreciate that it is often necessary to lock a flow control valve in a select condition. For example, actuation of the valve is undesirable when an operator is maintaining or otherwise working on the valve. It is particularly important to lock out a remotely controlled valve, wherein valve actuation might cause damage to the valve or injury to an unsuspecting worker while the valve is being maintained. It is also common to lock a flow control valve in a closed position during maintenance of the flow line downstream from the valve. That is to say, it is often undesirable to have material flow through the line during line maintenance, and the valve may consequently be locked in a closed position to prevent material flow beyond the valve so that the portion of the line downstream from the valve can be worked on without material flowing therethrough.

However, numerous problems are associated with conventional valve lockout designs. For example, the valve lockout device may fail to securely lock the valve against actuation, which is especially problematic when a powerful actuator is utilized to open and close the valve. A number of lockout devices are not tamperproof and consequently may be removed by unauthorized personnel or by workers having no knowledge that the valve should remain locked out. In addition, a number of conventional valves are not designed to be locked out, and the valve must consequently be retrofitted with structure for selectively locking out the valve. The lockout devices utilized with such valves often do not effectively prevent valve actuation and are difficult to use.

One particular valve design (a so-called "gate valve") includes a casing connected to the flow line, a valve plate shiftable relative to the casing between open and closed positions, an actuator including a linearly shiftable control member connected to the valve plate for effecting shifting of the plate, and a pair of yokes rigidly interconnecting the actuator and casing. Those ordinarily skilled in the art will appreciate that conventional gate valve designs are particularly problematic. It is believed that no gate valve has heretofore been originally designed to include a lock out device, thereby requiring the valve to be retrofitted when a lockout device is desired. Such a retrofit typically includes a rigid, elongated, metal bar and a pair of spaced apart, metal blocks fixed to one of the yokes (e.g., by welding). Each of the blocks is positioned along the yoke at a location that allows the bar to be disposed between the block and the control member to prevent shifting of the control member relative to the yoke. As is customary, the bar and blocks are designed to lock the valve in the open and closed conditions.

Beyond requiring the valve to be retrofitted, this traditional design presents numerous additional problems. For example, a retrofitted valve is often incapable of being locked in a completely open and/or closed position. It is virtually impossible to precisely retrofit the valve, and consequently, there is often "slop" in the components used to lockout device. This will sometimes require removal and reinstallation of the retrofit components (e.g., when the bar is too large to be wedged between one of the blocks and the control member) or, in the alternative, slight shifting of the control member out of the open or closed conditions before the bar engages both the member and block in a manner to prevent further movement of the member. In the latter case, use of the lockout device may require a worker to hold the bar between one of the blocks and the control member as the member is shifted slightly from the selected lock out condition (e.g., open or closed). In addition, if the control member is subsequently shifted toward the select condition, the bar is likely to sufficiently disengage the control member and/or corresponding block and fall from its operating orientation. Furthermore, material will likely be permitted to flow through the valve if the valve plate is required to be shifted slightly out of the closed position. It has also been determined that most valves have a seat that will wear, and the location of the valve plate in the closed position will consequently change over time. Thus, even if the valve assembly were to be precisely retrofitted, the lockout device would eventually be incapable of locking the valve in the completely closed condition. This problem would be experienced even if the valve were to be precisely designed for use with the bar-type lockout device.

OBJECTS AND SUMMARY OF THE INVENTION

Responsive to these and other problems, an important object of the present invention is to provide a valve assembly that can be prevented from being actuated out of a select condition or conditions. It is also an important object of the present invention to provide a lockout device that securely locks a valve in a select condition or conditions. Another important object of the present invention is to provide a valve that is specifically designed and manufactured for use with a lockout device. In addition, an important object of the present invention is to provide a lockout device that is durable, inexpensive, and easy to use. Yet another important object of the present invention is to provide a lockout device configured to securely lock the valve against actuation regardless of manufacturing inaccuracies or other variances, such as those caused by wear. Furthermore, an important object of the present invention is to provide a tamperproof lockout device that prevents unauthorized removal. Additionally, an important object of the present invention is to provide a lockout device that is operable to alternatively secure the valve in the completely open and closed conditions. Yet another important object of the present invention is to provide a lockout device that is particularly effective when used with gate valves and to provide an improved gate valve design for use with lockout devices.

In accordance with these and other objects evident from the following description of the preferred embodiment, the present invention concerns a lockout device for use with a valve having a pair of spaced apart, generally opposed abutment surfaces, with at least one of the abutment surfaces being shiftable relative to the other in such a manner that the spacing between the surfaces decreases when the valve is actuated. The lockout device is adjustable and includes a pair of generally oppositely facing engagement faces positionable between the abutment surfaces. The distance between the engagement faces is selectively adjustable so that the user may vary the effective length of the lockout device. This adjustability ensures positive interengagement between the abutment surfaces and engagement faces to prevent shifting of the at least one abutment surface toward the other abutment surface, and thereby prevent actuation of the valve. In this respect, the lockout device may be used to securely lock a valve in the complete open or closed condition, regardless of manufacturing inaccuracies or other variances, simply by adjusting the device so that the engagement faces positively engage the abutment surfaces when the valve is in the open or closed conditions.

The invention also concerns an improved gate valve design, wherein at least one yoke is provided for interconnecting the actuator and casing. The yoke has spaced apart first and second projections that extend generally toward the control member. The projections cooperate with the control member to present respective first and second pairs of spaced apart, generally opposed abutment surfaces configured to receive the lockout device therebetween. The abutment surfaces presented by the projections are substantially flat and oblique with respect to the generally linear path of movement defined by the control member.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figures 1, 2:
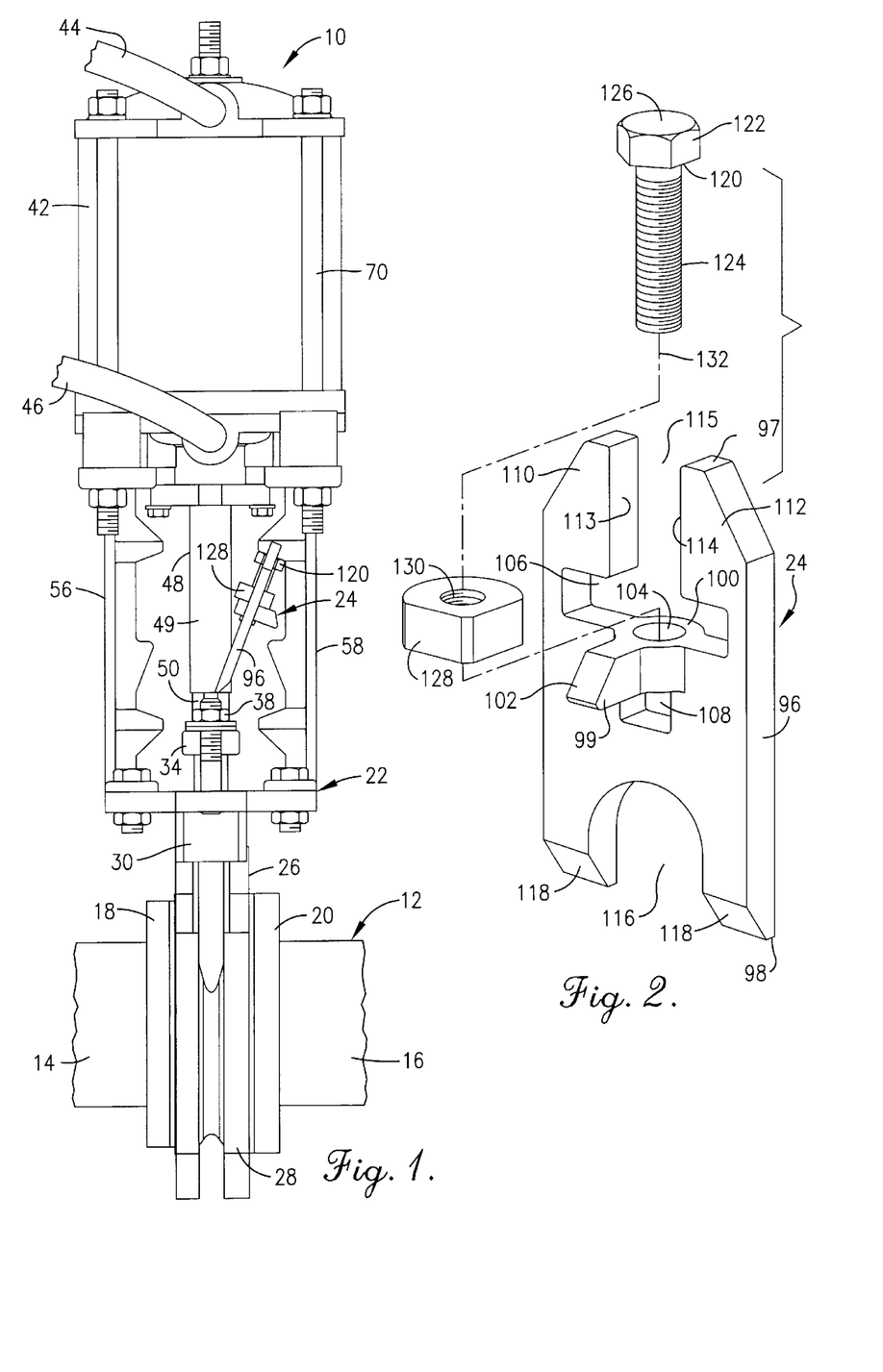
FIG. 1 is a fragmentary side elevational view of a gate valve assembly constructed in accordance with the principles of the present invention, with the valve assembly being interposed along a customary material flow line and including an adjustable lockout device for alternatively locking the valve in the open and closed conditions.
FIG. 2 is an enlarged, exploded perspective view of the lockout device shown in FIG. 1.
Figure 3:
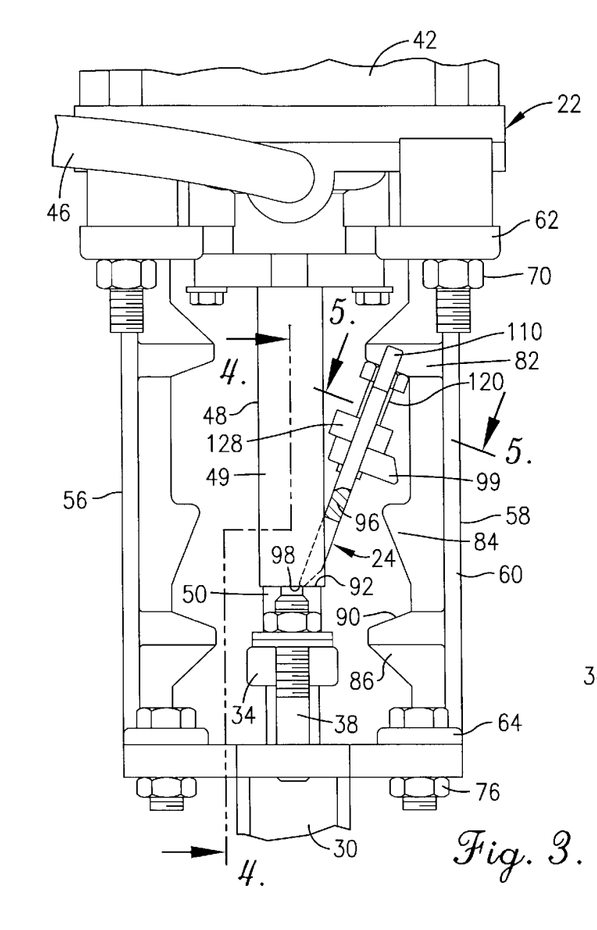
FIG. 3 is an enlarged, fragmentary side elevational view of the gate valve assembly shown in FIG. 1, particularly illustrating the valve locked in the closed position by the lockout device.

Turning initially to FIG. 1, a gate valve assembly 10 constructed in accordance with the principles of the present invention is illustrated as being associated with a customary material flow line 12. In the usual manner, the flow line includes pipe sections 14 and 16 having respective connecting flanges 18 and 20 at their adjacent ends. The gate valve assembly 10 and pipe sections 14, 16 are interconnected by suitable means, such as nut and bolt assemblies (not shown), so that a common material pathway is defined within these components. The flow line 12 may be used to convey solids or fluids, as will be understood by those ordinarily skilled in the art.

The gate valve assembly 10 generally includes a gate valve 22 for controlling material flow along the line 12, and an adjustable lockout device 24 designed to alternatively lock the valve 22 in the open and closed conditions. It will be appreciated, however, that the principles of the present invention are equally applicable to virtually any type of valve having a pair of spaced apart, generally opposed abutment surfaces that are relatively shiftable so that the spacing between the surfaces decreases when the valve is actuated.

With the foregoing caveat in mind, the illustrated valve 22 includes a casing 26 defining a material passageway (not shown) that communicates with the flow path defined by the pipe sections 14, 16. As is customary, the casing 26 includes a lower generally ring-shaped portion 28 (see FIG. 1) and an integral upper T-shaped portion 30 projecting radially from the lower portion 28. The lower portion 28 defines the passageway and includes a plurality of circumferentially spaced bolt-receiving holes (also not shown) for facilitating connection with the flanges 18,20. An open slot 32 (shown in phantom lines in FIG. 4) extends through the upper portion 30 and into the passageway defined by the lower portion 28. An adjustable gland 34 is aligned with the open slot 32, and a pair of mechanical fasteners 36 and 38 (see FIG. 4) project from the end of the upper portion 30 for clamping against the gland 34 and thereby compressing the packing (not shown). Depending upon the operating conditions of the valve assembly 10, a variety of packing materials (e.g., fiberglass, high temperature flax, etc.) may be used.

A substantially flat valve plate 40 is slidably received within the open slot 32 and the gland 34 for generally linear movement between open and closed positions. In the usual manner, the plate 40 is dimensioned to extend completely across the passageway, when in the closed position, to block material flow therethrough. The plate 40 may be provided with a beveled knife-like edge (not shown) for pushing aside and cutting through solids in the passageway as the plate is moved toward the closed position. A valve seat (also not shown) is preferably provided along the inside of the lower portion 28 of the casing 26, with the seat being designed to sealingly engage the plate 40 when the plate is in the closed position. Depending upon the operating conditions of the valve assembly 10, any suitable seat material (e.g., stainless steel, chloroprene, EPDM, fluororubber, etc.) may be used. It is also noted that various materials may be used to form the valve plate 40 (e.g., stainless steel when the valve assembly 10 is intended for use in a corrosive environment).

Spaced from the casing 26 is an actuator 42 for controlling movement of the valve plate 40. In the illustrated embodiment, the actuator 42 comprises a double acting pneumatic piston and cylinder assembly, although other suitable actuators (e.g., a hydraulic piston and cylinder assembly, a manually operated lever or hand wheel, an electric motor, etc.) may be used. A pair of hoses 44 and 46 extend from the actuator 42 to a pneumatic system (not shown) having a source of pressurized fluid, thereby permitting an operator to remotely control the actuator 42 via the pneumatic system. The illustrated actuator 42 includes a control member 48 fixed to the piston, such that the member shifts along a generally linear path as the piston moves within the cylinder. The control member 48 comprises an elongated cylindrical rod 49 and a clip 50 fixed to the distal end of the rod 49. The clip 50 is designed to attach to the valve plate 40. As perhaps best shown in FIGS. 4 and 6–7, the illustrated clip 50 comprises a pair of spaced apart, rectangular-shaped bars 50*a* and 50*b* receiving the adjacent end of the valve plate 40 therebetween. A pair of mechanical fasteners 52 and 54 (see FIG. 4) are received within aligned openings (not shown) in the bars 50*a*, 50*b* and valve plate 40, with the fasteners 52,54 serving to clamp the plate 40 between the bars 50*a*,50*b*.

In this respect, when pressurized fluid is delivered to the actuator 42 through the hose 44, the rod 49 extends progressively from the cylinder and the valve plate 40 is consequently shifted toward its closed position. Of course, fluid from the opposite end of the cylinder passes through the hose 46 and is typically vented to atmosphere. On the other hand, when pressurized fluid is delivered to the actuator 42 through the hose 46, the control rod 49 is retracted within the cylinder and the valve plate 40 is consequently shifted toward its open position. The hose 44 will serve as a vent line in this instance. It will be appreciated that the open and closed positions of the valve 22 correspond with the fully retracted and fully extended positions of the control rod 49, respectively. In addition, the valve 22 may be locked in a select condition simply by preventing movement of the control member 48 once the valve has been placed in the select condition.

The actuator 42 and the valve casing 26 are interconnected by an inventive arrangement that is particularly configured for use with the lockout device 24. The preferred arrangement comprises a pair of spaced apart, elongated yokes 56 and 58 extending between the valve casing 26 and actuator 42. In the illustrated embodiment, the yokes 56 and 58 are parallel to and on opposite sides of the linear path of travel of the control member 48. It is noted that the yokes 56 and 58 are identical in construction. Thus, only the right yoke 58 shown in the drawing figures will be described in detail herein, with the understanding that the left yoke 56 is similarly constructed and connected between the valve casing 26 and actuator 42. In addition, although the lockout device 24 has been shown in operation with only the right yoke 58, it will be appreciated that the device 24 may be associated with the left yoke 56 in virtually the same manner.

Figure 6:
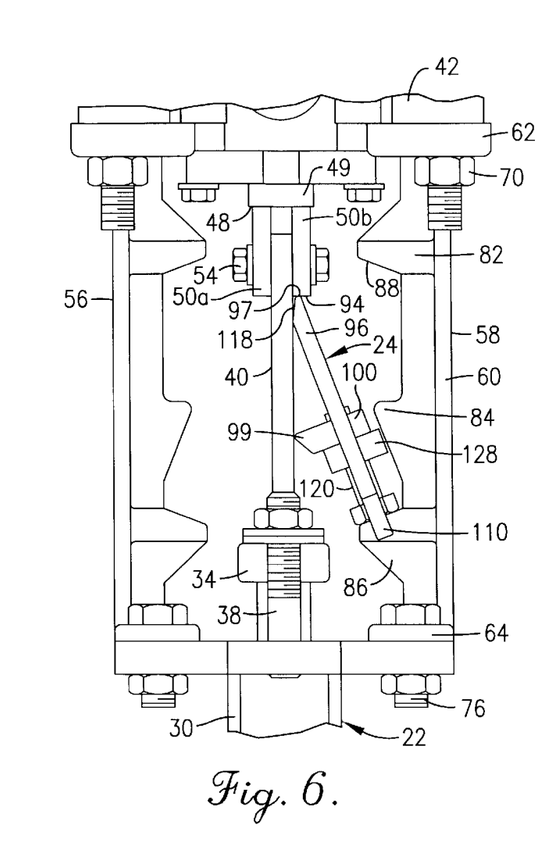
FIG. 6 is a fragmentary side elevational view similar to FIG. 3, but illustrating the valve locked in the open position by the lockout device.
Figures 7, 8:
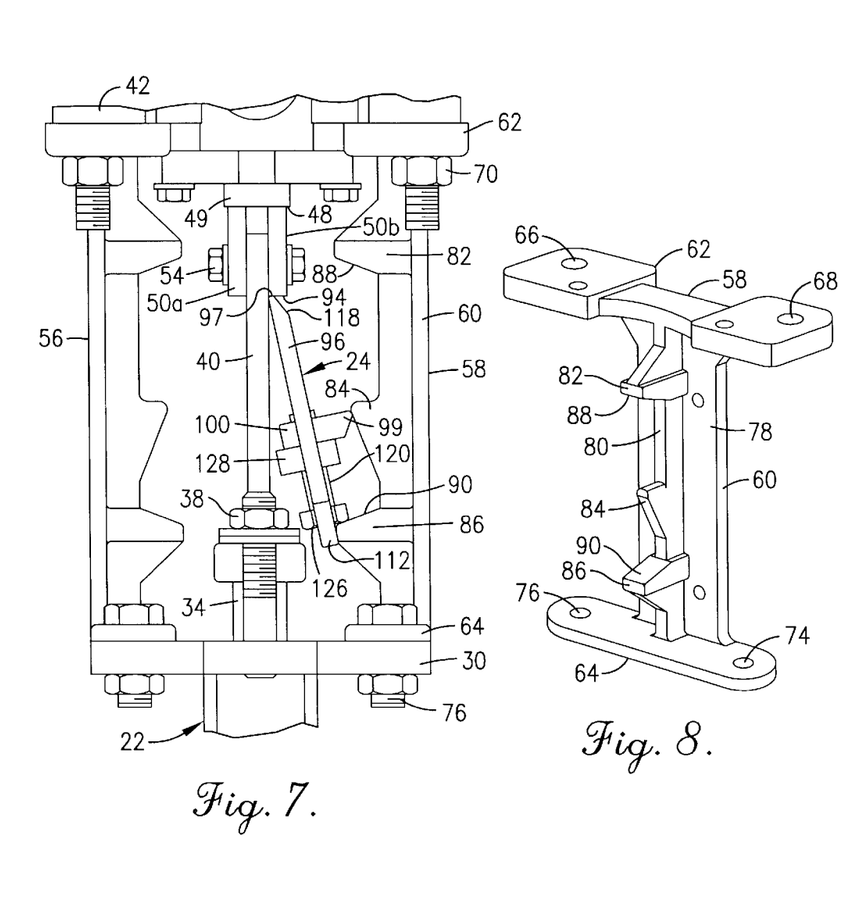
FIG. 7 is a fragmentary side elevational view similar to FIG. 6, but illustrating the means by which the lockout device is prevented from being improperly installed.
FIG. 8 is an enlarged perspective view of one of the yokes for interconnecting the actuator and casing of the valve.

Turning to FIG. 8, the yoke 58 preferably comprises an integral casting having a elongated web 60 and a pair of flanges 62 and 64 at opposite ends of the web 60. It is noted that the upper flange 62 shown in FIG. 8 includes a pair of flat, enlarged ends configured to engage the adjacent face of the actuator 42. A pair of bolt-receiving openings 66 and 68 are defined in the ends of the upper flange 62, with each opening 66 and 68 being configured to receive a long nut and bolt assembly 70 (only one of the assemblies being shown in FIGS. 1, 3 and 6–7) that serves to fasten the yoke 58 to the actuator 42. The lower flange 64 shown in FIG. 8 has a generally flat elliptical shape and likewise includes a pair of bolt-receiving openings 72 and 74. The yoke 58 is fastened to the valve casing 26 by nut and bolt assemblies 76 (only one of the assemblies being shown in FIGS. 1, 3 and 6–7) received in the openings 72 and 74. The web 60 comprises a flat panel 78 and a spine 80 that projects inwardly along the centerline of the panel 78. It is noted that the ends of the panel 78 flare outwardly toward the flanges 62,64. Moreover, the spine 80 includes three spaced apart, generally triangular-shaped projections 82,84,86 that extend inwardly toward the control member 48 when the yoke 58 is secured between the valve casing 24 and the actuator 42.

It is noted that the two outermost projections 82 and 86 present respective abutment surfaces 88 and 90 that are fixed relative to the control member 48. The abutment surfaces 88 and 90 are preferably flat and oblique relative to the path of travel defined by the control member 48. Further, each abutment surface 88 and 90 faces generally toward the opposite end of the yoke 58. Because the yoke 58 extends along the path of the control member 48, each of the abutment surfaces 88 and 90 consequently faces toward the distal end of the control member (i.e., the clip 50) when the control member 48 is in the fully extended or fully retracted positions, respectively. That is to say, the abutment surface 88 generally faces toward the clip 50 when the control member 48 is fully extended (e.g., see FIG. 3), while the abutment surface 90 generally faces toward the clip 50 when the control member 48 is fully retracted (e.g., see FIG. 6). The clip 50 conveniently presents a substantially flat surface 92 (the upper surface of the clip 50 shown in the drawing figures) that is spaced from and in general opposition to the abutment surface 88, when the valve 22 is in the closed condition. It will be appreciated that the abutment surface 92 on the clip 50 moves generally toward the abutment surface 88, when the control member 48 is retracted, such that the spacing between the surfaces 88 and 92 decreases. The clip 50 also presents a second substantially flat surface 94 (the lower surface of the clip 50 shown in the drawing figures) which is similarly associated with the abutment surface 90 on the projection 86. Similar to the first corresponding pair of abutment surfaces 88 and 92, the second pair of abutment surfaces 90 and 94 are generally opposed, and the spacing between the surfaces 90 and 94 decreases when the control member 48 is extended.

Thus, the valve 22 may be locked from actuation, in either the closed or open conditions, by preventing relative movement of the respective pair of abutment surfaces 88,92 and 90,94. Again, it is noted that the present invention is equally applicable to various other valve designs having opposed abutment surfaces arranged so that the spacing of the between the surfaces decreases when the valve is actuated. Suitable alternatives include varying the location of the abutment surfaces on the control member or redesigning the structural element that interconnects the actuator and valve casing. In fact, with the inventive lockout device 24, the structural element may be provided with the traditional retrofit blocks (not shown). However, the illustrated yokes 56,58 are preferred because of the operating advantages gained from their unique design. For example, the integral casting construction creates less "slop" than the traditional retrofit design. Additionally, the oblique angles of the abutment surfaces 88 and 90 ensure that the lockout device 24 projects toward the opposed surfaces 92 and 94 to provide more secure resistance to valve actuation.

As previously indicated, the lockout device 24 is designed to alternatively prevent the spacing between each pair of abutment surfaces 88,92 and 90,94 from decreasing, and thereby prevent actuation of the valve 22 out of the closed and open positions. In particular, the lockout device 24 includes a plate-like base 96 preferably formed of a strong noncorrrosive material. The base 96 presents a pair of opposite ends 97 and 98 and is generally flat, except for a substantially centrally located, transverse lug 99 projecting from a generally cylindrical seat 100 (see FIG.2). It is noted that the lug 99 includes an angled end face 102. A bore 104 extends through the seat 100 and interconnects an open slot 106 defined in the base 96 on one side of the seat 100 and a relatively smaller notch 108 defined in the base 96 on the opposite side of the seat. Adjacent the end 97 of the base 96 are a pair of spaced apart arms 110 and 112 that cooperatively present two opposed, substantially flat retaining faces 113 and 114, for purposes which will subsequently be described. An elongated gap 115 is defined between the faces 113 and 114, with gap 115 extending from the end 97 to the slot 106 and being dimensioned to alternatively receive each projection 82 and 86 therein (e.g., see FIG. 4). Extending inwardly from the opposite end 98 of the base 96 is a semicircular opening 116 dimensioned to receive the rod 49 therein when the lockout device 24 is installed. It is also noted that a beveled surface 118 extends inwardly from the opposite end 98. If desired, the base 96 may be tethered to the valve 22 so as to retain the lockout device 24 in a convenient location with respect to the valve 22.

The lockout device 24 further includes a bolt 120 having a hexagonal-shaped head 122 and an externally threaded shank 124 projecting from the head 122. The bolt 120 has a substantially flat end face 126 defined on the head 122, for purposes which will subsequently be described. A nut 128 is associated with the base 96 and threadably coupled with bolt 120 so that the bolt 120 may be shifted relative to the base 96. It will be appreciated that the bolt 120 and nut 128 are configured to withstand the operating loads experienced during use. For example, a one-half inch standard coarse thread bolt and nut are preferred when the device 24 is used in connection with a six inch gate valve, while a three-eighth inch nut and bolt should be sufficient for use with three inch gate valves.

In the preferred arrangement, the nut 128 includes an internally threaded opening 130 receiving the shank 124 of the bolt 120, with the shank 124 and opening 130 consequently defining a common thread axis represented by the line 132 shown in FIG. 2. Additionally, the nut 128 is dimensioned to be received within the slot 106 so that shifting of the nut 128 along the thread axis is generally prevented, while rotation of the nut 128 about the axis is permitted. The nut 128 is aligned with the bore 104, and the bore is dimensioned to receive the shank 124 of the bolt 120. It is also noted that the notch 108 accommodates the tip of the shank 124, if necessary. In the illustrated embodiment, the base 96 and bolt 120 are configured so that the head 122 is slidably received within the gap 115, however, the retaining faces 113, 114 engage opposite sides of the head 122 to prevent relative rotation of the bolt 120. In this respect, the bolt 120 may be shifted along the thread axis relative to the base 96 simply by rotating the nut 128. It will be appreciated that the nut 128 is prevented from shifting laterally relative to the base 96 as a result of the bolt shank 124 being received within the bore 104. In view of the foregoing, the end 98 of the base 96 and the face 126 of the bolt head 122 cooperatively present a pair of engagement faces that project in generally opposite directions, with the spacing between the faces being adjustable as the bolt 120 is shifted axially relative to the base 96.

The lockout device 24 may consequently be used to securely lock the valve 22 in the open or closed condition. For example, when the control member 48 is fully extended so that the valve plate 40 is in the closed position, the control member 48 and yoke 58 cooperatively present the abutment surfaces 88 and 92 (the yoke 56 similarly cooperates with the clip 50 to present abutment surfaces, but the description will continue to concentrate on the right yoke 58 as noted above) and the lockout device 24 may be installed in the manner shown in FIG. 3. Particularly, the projection 82 is received within the gap 115 between the arms 110 and 112, thereby preventing lateral shifting of the lockout device 24 relative to the yoke 58, and the end 98 of the base 96 is placed against the abutment surface 92 defined on the clip 50. The nut 128 is then rotated until the end face 126 on the bolt head 122 is brought into flush contact with the abutment surface 88 defined on the projection 82. It is noted that the semicircular opening 116 defined in the base 96 accommodates the rod 49. The nut 128 is preferably tightened so that the engagement faces 98,126 positively and securely engage the abutment surfaces 88,92. This will consequently prevent the control member 48 from retracting and thereby lock the valve in the closed position.

Figures 4, 5:
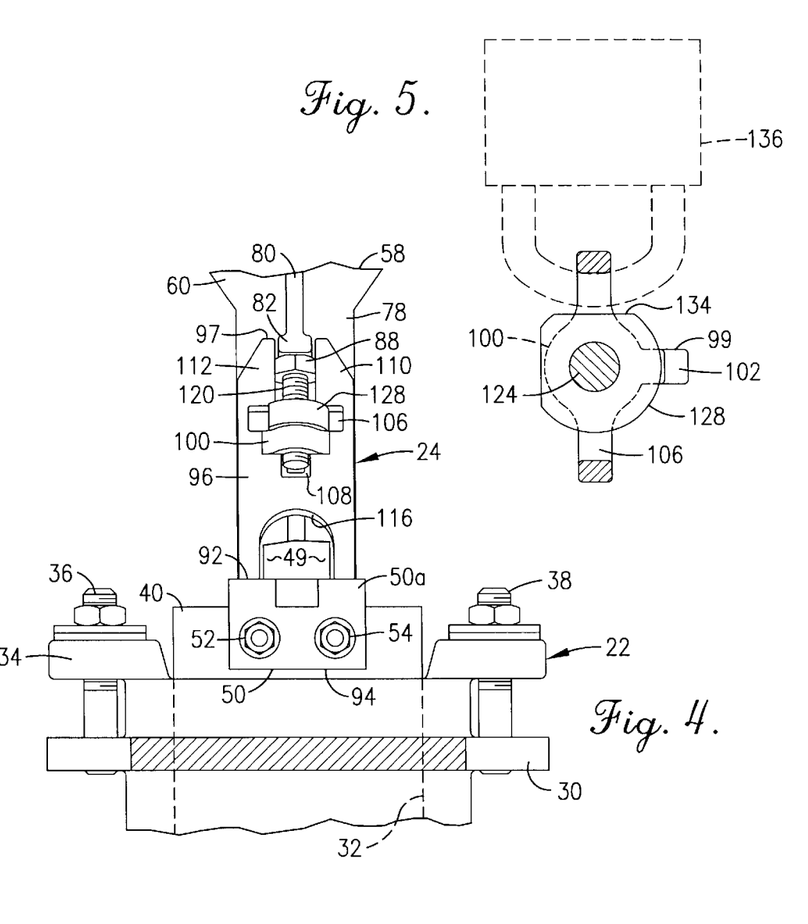
FIG. 4 is a cross-sectional view taken along line 4—4 of FIG. 3.
FIG. 5 is an enlarged cross-sectional view taken along line 5—5 of FIG. 3, particularly illustrating a padlock coupled to the lockout device in a manner to prevent removal of the device from the valve.

As perhaps best shown in FIG. 5, the illustrated nut 128 has an outer surface 134 that presents a semicircular section and a pair of adjacent, relatively transverse flat sections. A suitable locking device, such as the padlock 136 shown in phantom lines in FIG. 5, may be connected to the base 96 to prevent unauthorized removal of the device 24. Particularly, the padlock 136 is dimensioned to be received within the slot 106 between the base 96 and one of the flat sections of the outer surface 134 of the nut 128 (as shown in FIG. 5). In addition, the padlock 136 is of sufficient size so that the nut 128 can be only slightly rotated (e.g., five to ten degrees) before the flat section engages the padlock 136. It is entirely within the ambit of the present invention to utilize various other locking devices, such as so-called "locking trees" or "safety lockouts" (not shown), with the illustrated device 24. It will be appreciated that it may be necessary to "back off" the nut 128 so that one of the flat sections of the outersurface 134 faces the side of the base 96, however, the insignificant rotation necessary to properly orient the nut 128 so that the padlock 136 may be received within the open slot 106 will not cause untoward looseness in the assembly.

The device 24 is similarly used to lock the valve 22 in the open condition. As shown in FIG. 6, the projection 86 is received between the arms 110, 112 and the end face 98 of the base 96 is placed against the abutment surface 94 defined on the clip 50. The beveled surface 118 adjacent the end face 98 is preferably angled so that the surface 118 contacts the valve plate 40 to maintain the lockout device 24 in the desired orientation and assist in resisting extension of the control member 48. In addition, the lug 99 projects toward the valve plate 40 and may contact the plate to maintain the lockout device in the desired orientation, especially by preventing the bolt head 122 from slipping off of the projection 86 during installation. It is noted that the intermediate projection 84 on the yoke 58 is configured to engage the lug 99 for preventing the user from improperly orienting the lockout device 24 on the valve 22. That is to say, if the user improperly orients the lockout device 24 so that the beveled surface 118 and lug 99 face outwardly toward the yoke 58 (as shown in FIG. 7), the intermediate projection 84 will engage the lug 99 and prevent the engagement faces 98, 126 from positively engaging the abutment surfaces 94,90. In fact, the end face 126 of the bolt head 122 will likely be caused to slip off the abutment surface 90 defined on the projection 86 when the nut 128 is tightened.

The adjustability of the lockout device 24 provides numerous advantages. For example, it is not necessary to precisely construct the assembly with extremely small, expensive tolerances to ensure that the valve 22 can be locked in the completely closed condition. That is to say, any manufacturing "slop" or variances caused over time (e.g., wear of the valve seat) may be accommodated for simply by adjusting the spacing between the engagement faces 98 and 126 so as to ensure secure and positive contact with the abutment surfaces 88 and 92. Additionally, because a precisely dimensioned bar need not be wedged between the abutment surfaces, installation is simplified and risk of damage to the components is reduced. The adjustability may also permit the device 24 to be used on various valve sizes and designs, although it is preferred that the device 24 be designed for use with one valve.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A lockout device for preventing actuation of a material flow control valve having a pair of spaced apart, generally opposed abutment surfaces, with at least one of the abutment surfaces being shiftable relative to the other in such a manner that the spacing between the abutment surfaces decreases when the valve is actuated, said lockout device comprising:

a body including a pair of generally oppositely facing engagement faces positionable between the pair of abutment surfaces, said body being operable to permit selective adjustment of the distance between the engagement faces so that the engagement faces are positively engageable with the pair of abutment surfaces to prevent the spacing between the abutment surfaces from decreasing, and thereby prevent actuation of the valve.

2. A lockout device as claimed in claim 1, said body including a pair of spaced apart arms configured to receive one of the abutment surfaces therebetween.

3. A lockout device as claimed in claim 1, said body including a base portion, on which one of the engagement faces is defined, and an adjustment portion, on which the other one of the engagement faces is defined, said adjustment portion being at least in part shiftable relative to the base portion.

4. A lockout device as claimed in claim 3, said adjustment portion including a screw that is shiftable relative to the base portion.

5. A lockout device as claimed in claim 4, said adjustment portion including a nut that is threadably intercoupled with the screw.

6. A lockout device as claimed in claim 5, said screw including an externally threaded shank and a relatively enlarged head, on which said other one of the engagement faces is defined, said nut including an internally threaded opening receiving the shank.

7. A lockout device as claimed in claim 6, said base portion including a bore aligned with said opening, with said bore being configured to receive the shank, said nut being associated with the base portion in a manner that permits rotation of the nut relative to the base portion but substantially prevents the nut from shifting along the thread axis.

8. A lockout device as claimed in claim 7, said base portion including a pair of spaced apart arms configured to receive one of the abutment surfaces therebetween, said arms cooperatively presenting a pair of opposed retaining faces configured to receive the head of the screw therebetween in a manner that permits shifting of the screw along the thread axis but restricts relative rotation of the screw, whereby rotation of the nut relative to the base portion effects shifting of the screw along the thread axis.

9. A lockout device as claimed in claim 8, said head of the screw having a polygonal-sided shape, said retaining faces being at least partially flat to engage respective sides of the head.

10. A valve assembly comprising:

a valve that may be actuated from a select condition, said valve having a pair of spaced apart, generally opposed abutment surfaces, with at least one of the abutment surfaces being shiftable relative to the other in such a manner that the spacing between the abutment surfaces decreases when the valve is actuated; and a lockout device including a pair of generally oppositely facing engagement faces positionable between the pair of abutment surfaces, said device being operable to permit selective adjustment of the distance between the engagement faces so that the engagement faces are positively engageable with the pair of abutment surfaces to prevent the spacing between the abutment surfaces from decreasing, and thereby prevent actuation of the valve.

11. A valve assembly as claimed in claim 10, said lockout device including a pair of spaced apart arms configured to receive one of the abutment surfaces therebetween.

12. A valve assembly as claimed in claim 10, said lockout device including a lug projecting outwardly between the engagement faces, said valve including a projection spaced between the abutment surfaces and configured to engage the lug and thereby prevent the engagement faces from positively engaging the abutment surfaces when the lockout device is oriented in such a manner that the lug projects toward the projection.

13. A valve assembly as claimed in claim 10, said lockout device including a base portion, on which one of the engagement faces is defined, and an adjustment portion, on which the other one of the engagement faces is defined, said adjustment portion being at least in part shiftable relative to the base portion.

14. A valve assembly as claimed in claim 13, said adjustment portion including a screw that is shiftable relative to the base portion.

15. A valve assembly as claimed in claim 14, said adjustment portion including a nut that is threadably intercoupled with the screw.

16. A valve assembly as claimed in claim 15, said screw including an externally threaded shank and a relatively enlarged head, on which said other one of the engagement faces is defined, said nut including an internally threaded opening receiving the shank.

17. A valve assembly as claimed in claim 16, said base portion including a bore aligned with said opening, with said bore being configured to receive the shank, said nut being associated with the base portion in a manner that permits rotation of the nut relative to the base portion but substantially prevents the nut from shifting along the thread axis.

18. A valve assembly as claimed in claim 17, said base portion including a pair of spaced apart arms configured to receive one of the abutment surfaces therebetween, said arms cooperatively presenting a pair of opposed retaining faces configured to receive the head of the screw therebetween in a manner that permits shifting of the screw along the thread axis but restricts relative rotation of the screw, whereby rotation of the nut relative to the base portion effects shifting of the screw along the thread axis.

19. A valve assembly as claimed in claim 18, said head of the screw having a polygonal-sided shape, said retaining faces being at least partially flat to engage respective sides of the head.

20. A gate valve configured to be prevented from actuation by a lockout device, said valve comprising:

a valve casing defining a material passageway;

a valve plate shiftable relative to the casing between a closed position, in which the valve plate extends across the passageway to block material flow therethrough, and an open position, in which the valve plate has shifted sufficiently out of the passageway to permit material flow therethrough;

an actuator spaced from the valve casing, said actuator including a plate control member shiftable along a generally linear path and connected to the valve plate so that shifting of the control member effects shifting of the plate; and at least one yoke interconnecting the actuator and casing, with the control member shifting generally along the yoke as the valve plate is shifted between the open and closed positions, said at least one yoke having spaced apart first and second projections that extend generally toward the control member, said first and second projections cooperating with the control member to present respective first and second pairs of spaced apart, generally opposed abutment surfaces configured to receive the lockout device therebetween when the valve plate is in the open and closed positions, said abutment surfaces presented by the projections being substantially flat and oblique with respect to the path of the control member.

21. A gate valve as claimed in claim 20, said at least one yoke comprising a casting and being elongated and substantially parallel to said path.

22. A gate valve as claimed in claim 20, said at least one yoke including an intermediate projection spaced between the first and second projections, said intermediate projection extending generally toward the control member to engage the lockout device when the device is received between the abutment surfaces in an improper orientation.

23. A gate valve assembly for association with a material flow path, said assembly comprising:

a valve casing defining a material passageway communicateable with the path;

a valve plate shiftable relative to the casing between a closed position, in which the valve plate extends across the passageway to block material flow therethrough, and an open position, in which the valve plate has shifted sufficiently out of the passageway to permit material flow therethrough;

a remotely controlled actuator spaced from the valve casing, said actuator including a generally linearly shiftable plate control member connected to the valve plate so that shifting of the control member effects shifting of the plate;

an elongated structural element interconnecting the actuator and casing, with the control member shifting generally along the length of the structural element as the valve plate is shifted between the open and closed positions, said structural element and said control member presenting a first pair of spaced apart, generally opposed abutment surfaces when the valve plate is in the open position, with the spacing between the first pair of abutment surfaces decreasing as the valve plate shifts from the open position to the closed position, said structural element and said control member further presenting a second pair of spaced apart, generally opposed abutment surfaces when the valve plate is in the closed position, with the spacing between the second pair of abutment surfaces decreasing as the valve plate shifts from the closed position to the open position; and a lockout device including a pair of generally oppositely facing engagement faces alternatively positionable between each pair of abutment surfaces, said lockout device being operable to permit selective adjustment of the distance between the engagement faces so that the engagement faces are positively engageable with each pair abutment surfaces for selectively preventing shifting of the valve plate out of the open or closed positions.

24. A gate valve assembly as claimed in claim 23, said structural element comprising at lease one yoke having spaced apart first and second projections, on which respective ones of the abutment surfaces are defined.

25. A gate valve assembly as claimed in claim 24, said lockout device including a lug projecting outwardly between the engagement faces, said at least one yoke including an intermediate projection spaced between the first and second projections and configured to engage the lug and thereby prevent the engagement faces from positively engaging the first pair of abutment surfaces when the lockout device is oriented in such a manner that the lug projects toward the intermediate projection.

26. A gate valve assembly as claimed in claim 23, said lockout device including a base portion, on which one of the engagement faces is defined, and an adjustment portion, on which the other one of the engagement faces is defined, said adjustment portion being at least in part shiftable relative to the base portion.

27. A gate valve assembly as claimed in claim 26, said adjustment portion including a screw that is shiftable relative to the base portion.

28. A gate valve assembly as claimed in claim 27, said screw including an externally threaded shank and a relatively enlarged head, on which said other one of the engagement faces is defined, said adjustment portion including a nut having an internally threaded opening receiving the shank.

29. A gate valve assembly as claimed in claim 28, said base portion including a bore aligned with said opening, with said bore being configured to receive the shank, said nut being associated with the base portion in a manner that permits rotation of the nut relative to the base portion but substantially prevents the nut from shifting along the thread axis.

30. A gate valve assembly as claimed in claim 29, said base portion including a pair of spaced apart arms configured to receive one of the abutment surfaces therebetween, said arms cooperatively presenting a pair of opposed retaining faces configured to receive the head of the screw therebetween in a manner that permits shifting of the screw along the thread axis but restricts relative rotation of the screw, whereby rotation of the nut relative to the base portion effects shifting of the screw along the thread axis.

* * * * *